US007167415B2

(12) United States Patent
Neeson et al.

(10) Patent No.: US 7,167,415 B2
(45) Date of Patent: Jan. 23, 2007

(54) TRANSDUCERS FOR FOCUSING SONIC ENERGY IN TRANSMITTING AND RECEIVING DEVICE

(75) Inventors: Ian Andrew Neeson, Maitland (CA); Mikhail Kneller, Bronx, NY (US)

(73) Assignee: Packaging Technologies & Inspection LLC, Tuckahoe, NY (US)

( * ) Notice: Subject to any disclaimer, the term of this patent is extended or adjusted under 35 U.S.C. 154(b) by 315 days.

(21) Appl. No.: 10/940,978

(22) Filed: Sep. 15, 2004

(65) Prior Publication Data

US 2006/0056274 A1 Mar. 16, 2006

(51) Int. Cl.
*H04B 1/00* (2006.01)
*H04R 1/20* (2006.01)

(52) U.S. Cl. ...................... 367/138; 181/153; 181/175; 381/339

(58) Field of Classification Search ................ 181/153, 181/175; 381/160, 339; 367/138; 310/335
See application file for complete search history.

(56) References Cited

U.S. PATENT DOCUMENTS

| | | | | |
|---|---|---|---|---|
| 2,862,384 | A | 12/1958 | Renaut | |
| 3,451,260 | A * | 6/1969 | Thurstone | 367/151 |
| 3,965,455 | A | 6/1976 | Hurwitz | |
| 4,025,805 | A * | 5/1977 | Coltman et al. | 310/335 |
| 4,495,817 | A * | 1/1985 | Hunt et al. | 310/335 |
| 4,791,430 | A | 12/1988 | Mills | |
| 5,193,527 | A * | 3/1993 | Schafer | 310/335 |
| 5,869,764 | A | 2/1999 | Schulte | |
| 6,869,407 | B1 * | 3/2005 | Ein-Gal | 601/2 |
| 2003/0225346 | A1 | 12/2003 | Ein-Gal | |

* cited by examiner

*Primary Examiner*—Ian J. Lobo
(74) *Attorney, Agent, or Firm*—Dowell & Dowell PC

(57) ABSTRACT

Ultrasonic transducers which include at least one internally directed generally concavely configured sonic energy radiating element which directs sonic energy toward at least one arcuate energy reflecting surface which redirects and focuses the energy through an opening in a housing defining the transducer. The configuration of the at least one radiating element and the at least one energy reflecting surface are such that sound waves from substantially any point along the radiating element to the reflecting surface and to a focus exteriorly of the opening are substantially equal. The transducers function to focus energy either as transmitters or receivers.

12 Claims, 3 Drawing Sheets

TRANSDUCERS FOR FOCUSING SONIC ENERGY IN TRANSMITTING AND RECEIVING DEVICE

BACKGROUND OF THE INVENTION

1. Field of the Invention

This invention is directed to transducer devices for focusing energy of sonic, audible and ultrasonic waves in either transmitting devices such as loudspeakers and ultrasonic transmitters and receiving devices such as microphones and ultrasonic receivers. More particularly, the present invention is directed to transducers designed to maximize a sound radiating or receiving surface for focusing energy either being radiated from, or being received relative to, the transducers.

2. Brief Description of the Related Art

A variety of sonic energy transmitting and receiving devices are known which utilize thin film radiating elements. Such devices use the thin film to convert electrical signals into vibrations within a transmitting media such as in air, for air-coupled devices, or in water or other liquids, for liquid-coupled devices. The films may include, but are not limited to, metalized plastic films such as used in capacitance or electrostatic devices, piezoelectric plastic films used in piezoelectric devices, conductive films used in electromagnetic devices and the like. The total of the sonic energy generated or received by such devices is generally proportional to the surface area of the radiating element while a frequency and bandwidth of such devices is determined by properties of the radiating film as well as the structure of the backing element associated with the film. One known method of optimizing resonance frequency of such devices is to use a perforated type film and or to micro machine or texturize the backing surface for the film.

Cylindrical ultrasonic transducers are currently known which are specifically designed to focus sonic energy along a line of focus. However, the ability of such known devices to focus sonic energy into small regions is limited because of the geometric configuration of such devices. A total area of a radiating element of a cylindrical transducer device is proportional to the radius of the cylindrical configuration of the transducer. However, the total path length of the sound waves and, therefore, the attenuation of the sound within a coupling media, is also proportional to the radius of the cylinder. Because of the total area of the radiated energy from cylindrical transducer devices, most applications of such devices cause sonic waves to be reflected from a target surface without significant useful effect. This is especially true in the field of ultrasonic testing of laminate surfaces, package seals and the like.

Another limiting factor of known cylindrical transducer devices is the conformity of the radiating film element to the structure of the cylindrical shape of the transducer. Any deviation of the film radiating from the cylindrical surface can cause significant loss of efficiency. If there is more that 1/16 of a wave length of deformation between the radiating film and the cylinder, significant loss of efficiency occurs. This makes it only practical for relative low frequency use of such devices. Current methods of providing conformity between the sound radiating films and the cylindrical support surfaces of supporting electrodes include the use of adhesives or the use of mechanical applications of force around the periphery of the films or by the use of vacuum to draw the films to the cylindrical electrode surface.

For many industrial applications, it would be preferred to be able to focus sonic energy into a smaller area or a concentrated point than is possible using conventional cylindrical transducer type devices. To accomplish such focusing using thin film radiating elements, the radiating film would have to conform to a three dimensional surface such as a sphere which would be very difficult if not impossible to practice. Therefore, in order to create focused energy, known spherical or point focused transducer devices utilize solid radiating elements such as piezoelectric crystals. This makes such devices relatively expensive and limits the size of such transducers.

An alternate method of focusing sonic energy into a point focus is to use a flat radiating element and parabolic off-axis reflector. However, the total area of the reflector, and thus the radiating element, is limited by useful insertion angles of the sonic beam. The total path length of the sound waves and, therefore, the attenuation of the sound in a coupling media, is proportional to the focal distance and diameter of the reflector. The length of the sound path from each point on the radiating element to a focus point tends to be relatively long and further, there are generally parallel paths which extend from the radiating element to the reflector. Therefore, there is no energy concentration but only loss of concentration due to the attenuation in the media in which the transducer is functioning.

Yet another alternative method of focusing sonic energy into a point is to use a flat radiating element and Fresnel lens. The Fresnel lens could by a very thin element and therefore could operate without significant loss of energy due to attenuation in a media. However, a Fresnel lens works only for specific frequencies and thus is only practical for applications where very narrow bandwidth transmissions are used.

In view of the foregoing, there is a need to configure transducers which may operate either as transmitters or receivers in such a manner that sonic energy may be concentrated or focused into a point or other narrow area regardless of the media in which the transducer is used.

SUMMARY OF THE INVENTION

The present invention is directed to structures for sonic transducers which may be used as transmitters or as receivers in a plurality of technologies where it is desired to specifically focus sonic energy. The energy may be focused as a point source, as a line source or as another geometric configuration utilizing the teachings of the invention.

The transducers of the present invention are particularly structured so as to define one or a plurality of generally arcuate radiating surfaces utilizing thin film radiating elements which are supported in relationship to an electrode or a plurality of electrode surfaces. Energy being radiated or received is either radiated to or received from at least one spaced reflective arcuate surface which is specifically configured relative to the radiating surface so as to focus energy being transmitted or redirect energy being received such that a path length from a point of focus exteriorly of the transducer is essentially equal for each point along the radiating surface to and from the at least one reflecting surface and to and from the point of focus, such that there is a concentration of energy.

In preferred embodiments of the invention, each transducer is defined by a housing having an inner open area. One side of the inner open area defines a support for one or more arcuate concave electrodes which, in cooperation with thin sound radiating films define a first radiating element, or plurality of spaced radiating elements, the configuration of which are either circular or non-circular, such as elliptical, parabolic, cylindrical or of a cone configuration which surfaces concentrate sonic energy inwardly relative to an axis of the one or more radiating elements. Space oppositely of the radiating element or elements within the housing is at least one primary reflecting surface of a shape such as hyperbolic, elliptical, parabolic and the like which is generally convex in configuration and oriented toward the radiating elements.

In use as a transmitting transducer, energy radiated from the one or more radiating elements is reflected from the at least one reflecting surface either directly outwardly of an opening in the housing to a point of focus exteriorly of the housing or to an area such as a line of energy.

In other embodiments of the present invention, energy being reflected from the primary reflecting surface may be directed to a secondary reflecting surface which is generally semispherical, or of similar configuration, and which concentrates or focuses energy received from the primary reflecting surface and redirects the energy through an opening adjacent to the primary reflecting surface to a point of focus exteriorly of the transducer.

Utilizing the teachings of the present invention, it is possible to create a very large energy radiation area and concentrate the energy to a point of focus exteriorly of the transducer thereby allowing the application of the transducer in a plurality of industrial technologies where focused energy is desirable and/or necessary, such as in packaging seal inspection technology or laminate inspection technology.

In accordance with the teachings of the invention, the film radiating element or elements are supported relative to the one or more electrodes utilizing open mesh materials which are generally sound transparent such that the radiating elements are maintained in proper alignment relative to the supporting electrode surface so there is less than 1/16 of a wave length in variation of sound transmitted at any point along the surface of the one or more radiating elements.

It is the primary object of the present invention to provide transducers for use in a plurality of industrial technologies wherein the transducers are specifically designed to focus energy either being received or transmitted with respect thereto into point, line or other areas of concentration.

A yet further object of the present invention is to provide ultrasonic transducers which have specific beneficial use in the area of airborne transducer technology such as in the airborne inspecting of seals in the packaging industry wherein energy being transmitted from one of the transducers may be focused to a maximum energy by being radiated from relatively large radiating surfaces and thereafter reflected to a point or other concentrated area to facilitate the passage of energy through laminated layers, such as associated with package seals.

It is also an object of the present invention to provide transducers which utilize thin film radiating technology wherein the thin films are mounted relative to electrodes in such a manner as to insure that there is uniform vibration of the radiating films along the length thereof to thereby prevent interference of sound transmission and to further concentrate sound energy at a point or other well defined area.

BRIEF DESCRIPTION OF THE DRAWINGS

A better understanding of the invention will be had with reference to the accompanying drawings wherein.

DESCRIPTION OF THE PREFERRED EMBODIMENTS

Figure 1:
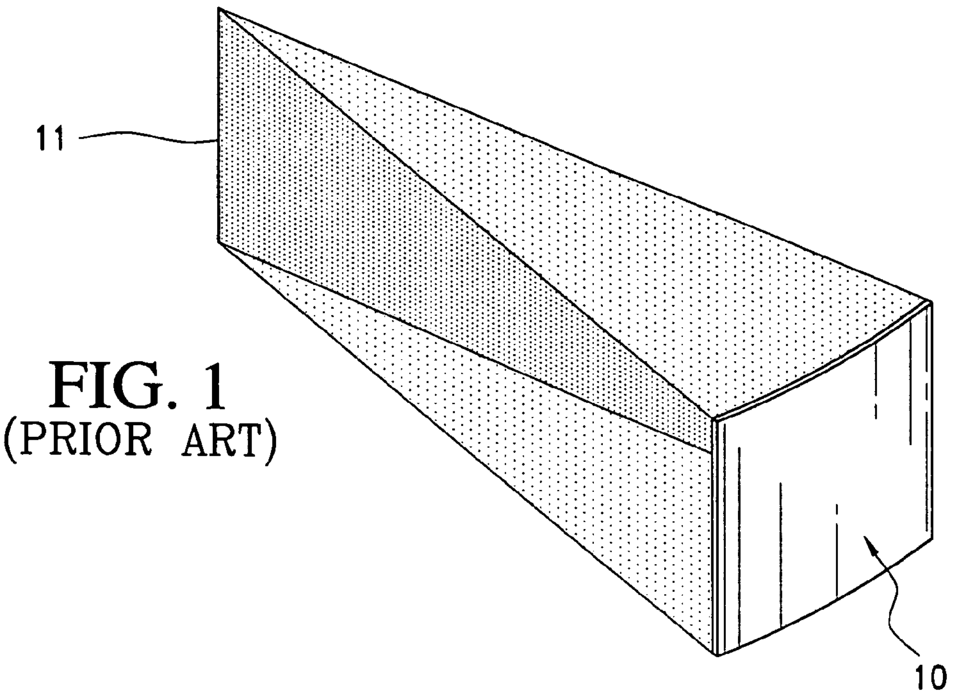
FIG. 1 (PRIOR ART)
FIG. 1 is an illustrational view showing a known cylindrical radiating element forming a line focus.
Figure 2:
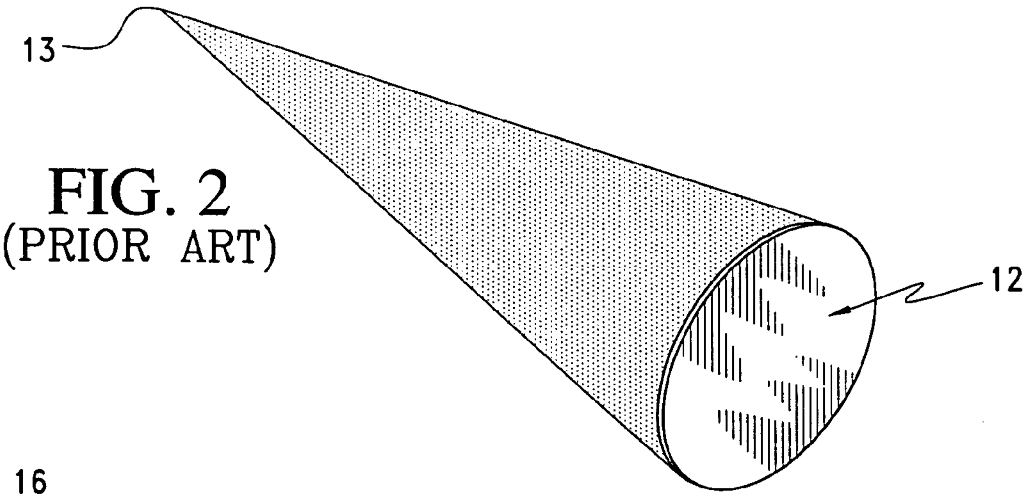
FIG. 2 (PRIOR ART)
FIG. 2 is an illustrational view of a known spherical radiating element for concentrating a point focus for a transducer.
Figure 3:
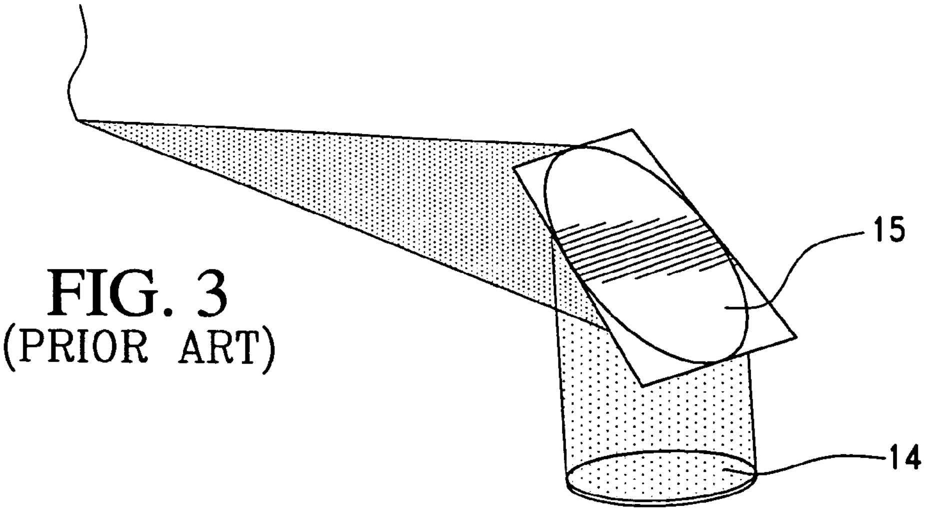
FIG. 3 (PRIOR ART)
FIG. 3 is an illustrational view of a flat radiating element with off-axis parabolic reflector for creating a point focus of energy for use in a transducer.

With specific reference to FIGS. 1–3, there are specific limitations with prior art transducers of the thin film radiating type which effect the amount of sonic energy which can be effectively focused at a given point or area. In FIG. 1, a transducer radiating surface 10, which is generally semi-cylindrical in configuration, is shown as being able to generate a somewhat line source of energy concentration but is limited, as described with respect to the related art herein. The line of focus is shown at 11.

In FIG. 2, the radiating element of the transducer is in the form of a semi-spherical element 12 which may be utilized to concentrate energy at a point, however, there are limitations in the amount of energy which can be concentrated based upon the size or area of the radiating element and other factors as previously described herein. The point of focus is shown at 13.

With respect to FIG. 3, the creation of a point source of energy in a sonic transducer may also be created utilizing a flat radiating film element 14 which directs energy to an off-axis parabolic reflector 15 which thereafter directs the energy to a point source 16. However, the energy being transmitted and reflected does not effectively concentrate sonic energy as previously described.

Figure 4:
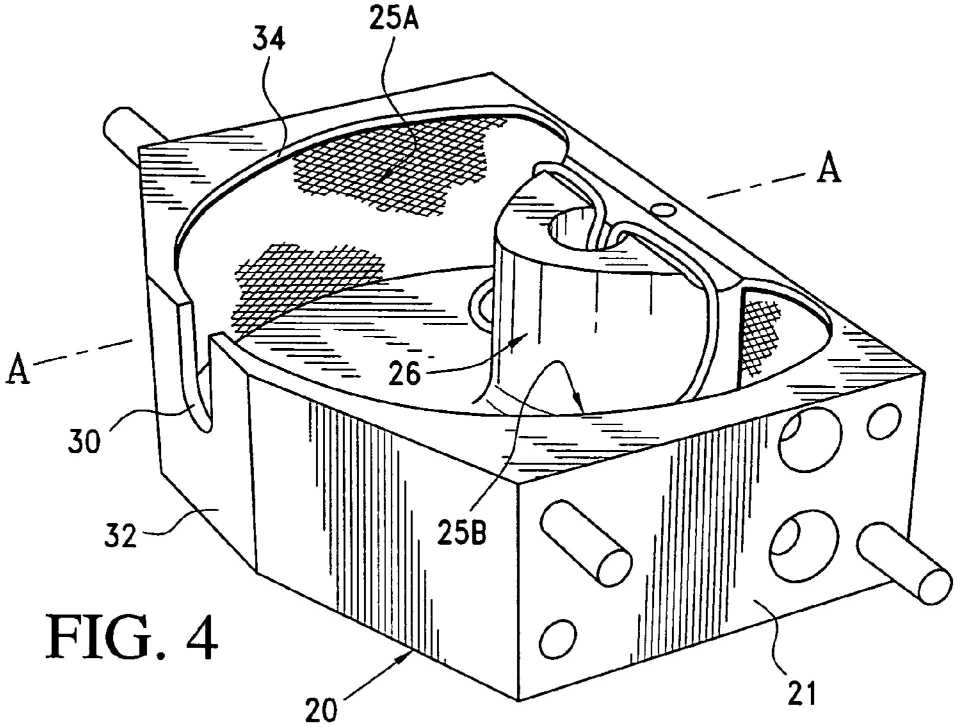
FIG. 4 is a top perspective view of a first embodiment of transducer of the present invention having the upper wall thereof removed and showing a pair of arcuate or cylindrical radiating elements and arcuate generally convex reflector surface for concentrating and focusing sonic energy through an opening to a point exteriorly of the transducer.

With specific reference to FIG. 4, a first embodiment of the present invention is shown. In the embodiment, transducer 20 includes a housing 21 which is shown having a cover portion removed. The transducer housing includes an enclosed lower wall 22 which, with the upper removed cover, define a generally arcuate open area 24 which separate a pair of arcuate sonic radiating elements 25A and 25B from an opposing primary energy reflecting or reflector surface 26. Sonic energy radiated outwardly relative to the reflective surface 26 is focused at a point 28, see FIG. 5, exteriorly of the transducer after passing through an opening 30 in a front wall 32 of the transducer housing.

The housing 21 of the transducer 20 may be formed of a metallic or nonmetallic material. In the embodiment shown, a front arcuate inner wall 34 is molded or machined in order to provide support for the radiating elements which, in the embodiment, includes the two radiating elements 25A and 25B which are respectively provided on opposite sides of the opening 30 and which are spaced from electrical contact in the area of the opening with respect to one another. With respect to FIGS. 6 and 7, the arcuate inner wall 34 is generally of a semi-cylindrical configuration and generally concave in curvature and may be semicircular or non-circular, such as elliptical, parabolic, cylindrical or cone shaped configuration so as to concentrate energy from a radiating element supported against the wall toward the reflecting surface 26. The reflecting surface is shown as being generally axially aligned along an axis A—A relative to the opening 30 which is central of the supporting wall 34 so that sonic energy is focused inwardly or outwardly through the opening 30 with respect to the point of focus 28.

Figure 5:
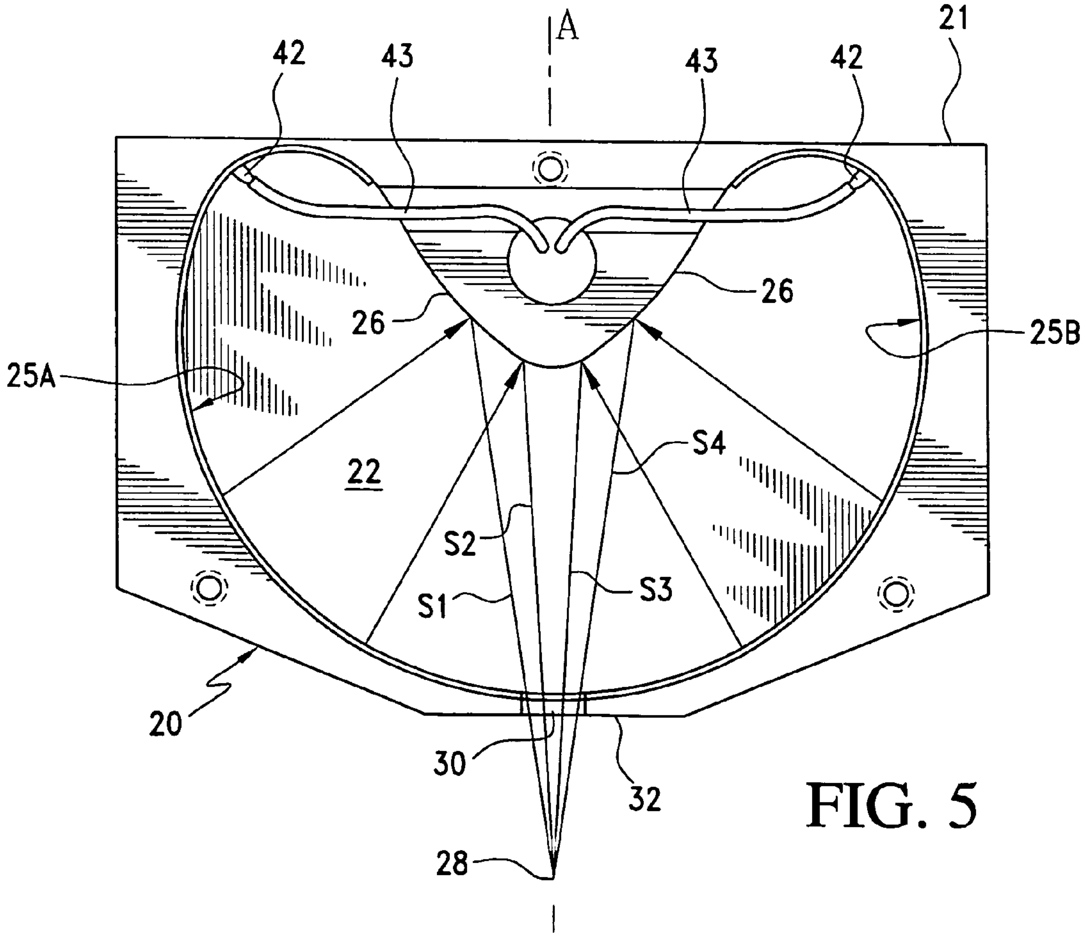
FIG. 5 is a top plan illustrational view of the transducer of FIG. 4 illustrating the energy paths from the radiating elements to the reflecting surface and to the point of focus from different points along the radiating elements.

The primary reflecting surface 26 is shown as generally being of a convex configuration and may be of a complex hyperbolic, elliptical, parabolic or similar shape. With the present invention, the configuration of the radiating elements, as defined by the inner support wall 34, and the shape of the primary reflecting surface 26, is such that the path length of any sound wave issuing from any point along one of the radiation elements 25A and 25B to the reflecting surface and therefrom to the point of focus 28, is generally identical. This is shown in FIG. 5 wherein a plurality of sound paths S1–S4 are illustrated each of which is of equal length between the sound radiating elements and the point of focus.

Because of the structure of the transducer of the invention, large radiating areas 25A and 25B are created to generate sonic energy. Further, the energy is reflected and focused by the reflecting wall 26 so as to concentrate the energy at a focal point 28. Also, because the effective length of each wave of energy is of the same length, the concentration of energy at the focal point is maximized.

Figure 7:
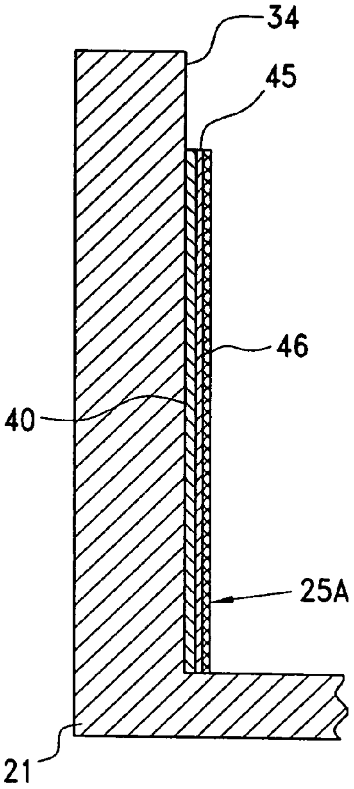
FIG. 7 is a cross-sectional view taken along lines 7—7 of FIG. 6.
Figure 6:
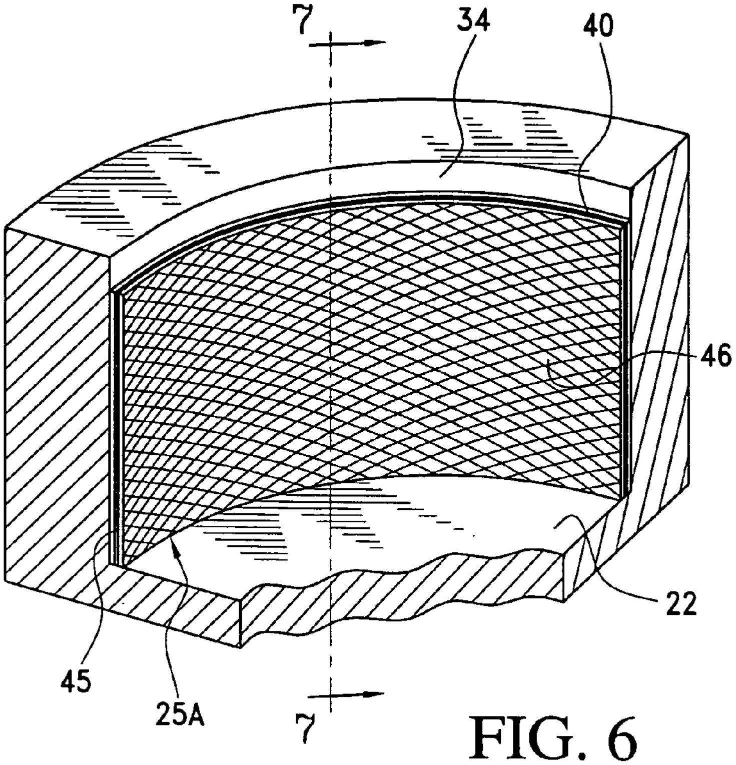
FIG. 6 is an enlarged perspective view of a section of a radiating element of the embodiment of FIG. 4 showing the radiating element mounted against the supported electrode and being further supported by an interior open mesh support element.

With specific reference to FIGS. 6 and 7, each of the radiating elements includes an inner metallic electrode 40 which is adhered or otherwise applied to the inner wall 34 of the transducer which forms the support for the electrode. Each electrode is electrically connected at 42, see FIG. 5, to an electrical lead 43 secured either to a source of power spaced remotely from the transducer housing or which extends to a receiver which is spaced remotely from the transducer housing.

The surface of each of the electrodes 40 may be treated in order to enhance transducer performance. In this respect, the electrodes may be sand-treated or coated with metal powder or painted to create certain irregular surface roughness to insure a wide bandwidth. Further, the electrodes may be covered with a perforated foil or with woven wire mesh or expanded metal mesh or similar material which presents irregular structure of certain size to optimize resonance frequency. In addition, the surface of the electrodes may be micro-machined to create irregular structures of certain size to optimize resonance frequency.

Mounted over each of the electrodes 40 are radiating metallic films 45 which vibrate relative to the electrodes. These films 45 must be free to move within certain limitations with respect to the electrodes, however, it is essential that they conform to the cylindrical surface of the support wall 34 such that the phase of vibration of any portion of the radiating elements remains the same and does not vary more than 1/16th of a wave length with respect to one another.

In view of the foregoing, the radiating films must be supported inside of the transducer to guarantee such radiation tolerances. In this respect, the present invention utilizes a supporting elements which are essentially transparent to sound such that they will not effect the sound being generated by the radiating films. It was discovered for a wide range of sonic frequencies that a thin plastic thread or woven mesh material which is generally less than one wave length in thickness and having a high percentage of open area can be used to sandwich the radiating films 45 intermediate the electrodes 40. The support mesh is shown at 46 in the drawing figures. Tests have shown that only approximately one dB energy loss is created by the use of the open mesh supporting material.

The mesh provides not only support for the thin radiating films but applies gentle pressure against the films toward the backed electrode. The mesh also provides electrical insulation of the charged metalized surface of the radiating film and also provides mechanical support for the films. The mesh is generally connected by an adhesive but may be connected by mechanical elements adjacent the edges thereof relative to the vibrating films.

In the embodiments shown in the FIGS. 4 and 5, the radiating elements are shown as two segments 25A and 25B which are focused along a common center line or the axis A—A of the transducer. Variations could be made with respect to each of the radiation elements to otherwise focus energy therefrom and yet remain within the teachings of the present invention. Further, a single continuous radiating element may be formed of the sandwich type structure as described herein and be within the teachings of the invention with an opening being created generally centrally of the front wall of the housing as previously described by providing an insulating area adjacent the opening relative to the continuous electrode.

Figure 8:
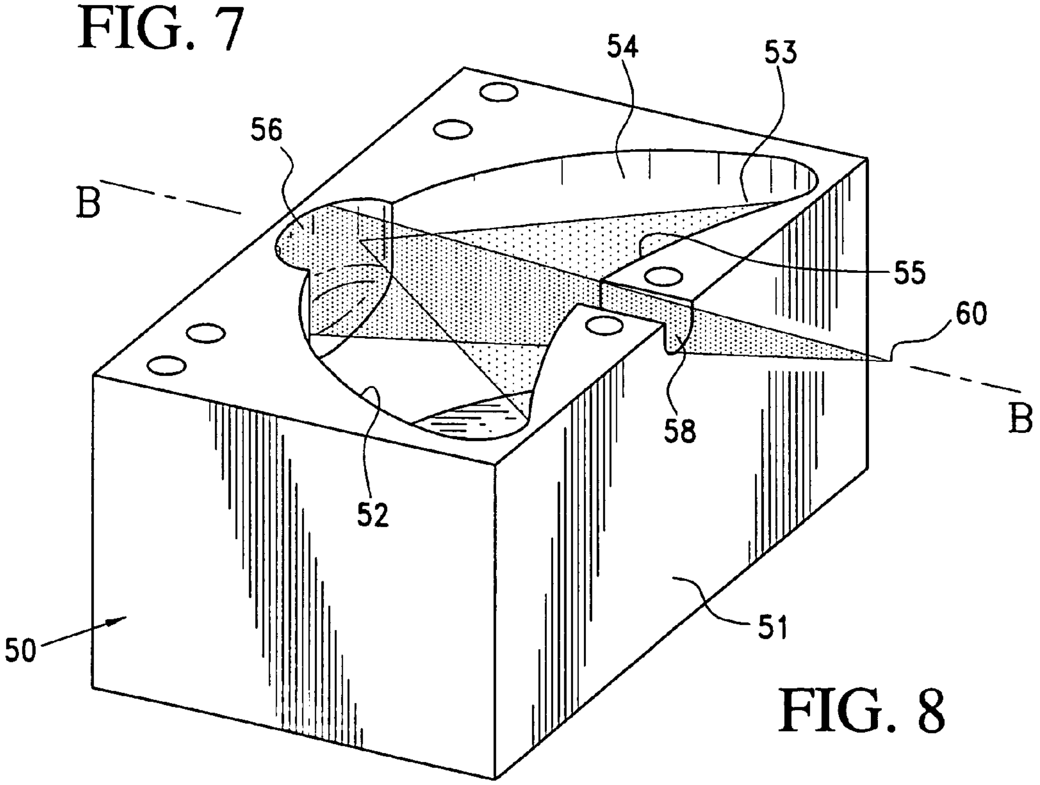
FIG. 8 is a perspective view of another embodiment of the present invention incorporating two reflecting surfaces and showing the energy being concentrated exteriorly of the transducer.

With specific reference to FIG. 8, a second embodiment of the invention is shown. In this embodiment, the transducer 50 includes a housing 51 which is designed to be closed at both the upper and lower portions, however, the upper cover is shown as being removed in the drawing figure. The housing defines an internal open area or cavity 53 which is defined by a first generally cylindrical radiating element 54 which opposes a primary first reflecting wall or surface 55 which is generally concave in configuration with respect to the first radiating wall. The radiating element or elements associated with the transducer are essentially the same as described with respect to the previous embodiment and will not be described in further detail with respect to the current embodiment. Thus, one or a plurality of radiating elements including an electrode, vibrating film and support mesh may be provided along the inner concave wall 52 of the present embodiment.

In the present embodiment, energy reflected from the primary reflecting surface 55 is directed toward a semi-spherical reflecting surface 56 which is provided generally centrally of the first arcuate wall 52. The surface 56 is shown as being recessed within the front wall of the transducer housing and aligned along an axis B—B with an exit opening 58 through the transducer housing to a point of focus 60 exteriorly of the transducer.

In the present embodiment, energy which is transmitted from the one or more radiating elements supported along the concave inner surface of the transducer is directed to the primary reflecting surface and the sonic energy therefrom is reflected to the secondary reflecting surface which is generally hemi-spherical or semi-spherical and concave in configuration and which is shaped to focus the sonic energy through the opening in the transducer housing to a point 60 as previously described.

As with the previous embodiment, the path length of each sound wave being radiated from a point along the surface of the one or more radiating elements is essentially equal from the radiating elements to the primary reflecting surface to the secondary reflecting surface and to the point of focus, thereby concentrating and focusing the energy at the point of focus.

As with the previous embodiment, the present embodiment may be used as a transmitting transducer or as a receiving transducer.

Each of the embodiments of the present invention focuses sonic energy at very concentrated areas which allow the use of the transducers in technologies where concentration of the sonic energy at a point close to the transducer is required to obtain necessary industrial results.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

We claim:

1. A transducer for focusing sonic energy comprising, an enclosed housing defining an internal open area, at least one generally concavely curved sonic energy radiating element within said open area in oriented space relationship to at least one arcuate energy reflecting surface, an opening in said housing through which focused sonic energy passes either from or toward said at least one energy reflecting surface and wherein said at least one sonic energy radiating element and said at least one energy reflecting surface are so configured that sound paths from substantially any point along said at least one sonic energy radiating element to said at least one sound reflecting surface and to an area of energy focus exteriorly of said housing are generally equal.

2. The transducer of claim 1 wherein said at least one sonic energy radiating element is configured as a semi-cylindrical, elliptical, parabolic or other concavely configured arcuate surface.

3. The transducer of claim 2 wherein said at least one energy reflecting surface is configured as a convex elliptical, parabolic or other convexly reconfigured arcuate surface.

4. The transducer of claim 3 including a secondary generally concavely curved energy reflecting surface adjacent said at least one sonic energy radiating element for receiving sound energy reflected from said at least one energy reflecting surface for focusing said reflected sonic energy through said opening to the area of focus exteriorly of said housing.

5. The transducer of claim 4 wherein said secondary generally concavely curved energy reflecting surface is generally semi-spherical in configuration.

6. The transducer of claim 3 wherein said at least one sonic energy radiating element includes an electrode disposed along an interior arcuate support surface of said housing which housing provides support for said electrode, a thin metallic vibrating film mounted over said electrode, and support means for supporting said thin film relative to said electrode to thereby permit uniform vibration along said thin film.

7. The transducer of claim 6 wherein said support means includes a substantially sound transparent material which is secured relative to said electrode so as to sandwich said thin film therebetween.

8. The transducer of claim 7 wherein said sound transparent material is an open plastic mesh.

9. The transducer of claim 8 including a plurality of spaced sonic energy radiation elements disposed along said interior support surface of said housing.

10. The transducer of claim 1 including a plurality of spaced sonic energy radiation elements disposed along said interior support surface of said housing.

11. The transducer of claim 5 including a plurality of spaced sonic energy radiation elements disposed along said interior support surface of said housing.

12. The transducer of claim 4 including a plurality of spaced sonic energy radiation elements disposed along said interior support surface of said housing.

* * * * *